United States Patent [19]
Collins et al.

[11] Patent Number: 5,166,224

[45] Date of Patent: * Nov. 24, 1992

[54] VULCANIZABLE NON-CRYSTALLINE ACETAL ELASTOMERS

[75] Inventors: George L. Collins, Maplewood; William M. Pleban, Stanhope; Milton J. Hayes, Jr., Irvinington, all of N.J.

[73] Assignee: Hoechst Celanese Corp., Somerville, N.J.

[*] Notice: The portion of the term of this patent subsequent to Aug. 20, 2008 has been disclaimed.

[21] Appl. No.: 636,811

[22] Filed: Jan. 2, 1991

[51] Int. Cl.$^5$ .................. C08F 2/46; C08G 65/16; C08L 59/02

[52] U.S. Cl. .................. 522/109; 522/142; 525/398; 525/410; 528/392; 528/403

[58] Field of Search ............... 522/109, 142; 525/410, 525/398; 528/392, 403

[56] References Cited

U.S. PATENT DOCUMENTS 4,758,608 7/1988 Collins et al. .................. 522/142

5,041,505 8/1991 Collins et al. .................. 525/398

*Primary Examiner*—Marion E. McCamish
*Assistant Examiner*—Mark A. Chapman
*Attorney, Agent, or Firm*—P. S. Kalyanaranan

[57] ABSTRACT

Non-crystalline elastomeric acetal polymers are disclosed which have ethylenic unsaturation in the polymer backbone. The polymers are synthesized by the ring-opening polymerization of 1,3-dioxolane, 1,3-dioxepane, and the cyclic formal of an ethylenically unsaturated diol having at least 4 adjacent carbon atoms in its main chain. The preferred cyclic formal is 4,7-dihydro-1,3-dioxepin. Because of the ethylenic unsaturation, the elastomeric acetal polymers can be vulcanized or cured with multifunctional vinyl monomers to produce elastomers with improved properties, such as better elasticity, decreased thermoplasticity and decreased solubility. The elastomeric acetals in any of their embodiments are particularly useful for blending with crystalline acetal polymers to improve the impact resistance of the crystalline acetal polymers.

42 Claims, No Drawings

VULCANIZABLE NON-CRYSTALLINE ACETAL ELASTOMERS

FIELD OF THE INVENTION

This invention relates to non-crystalline elastomeric acetal polymers which have ethylenic unsaturation in the polymer backbone and can thus be vulcanized, crosslinked, or cured by ultraviolet or other high energy radiation. The invention further relates to blends of crystalline acetal polymers with the non-crystalline ethylenically unsaturated acetal polymers and with vulcanized or cured derivatives of these non-crystalline acetal polymers.

BACKGROUND OF THE INVENTION

Molding compositions based on acetal polymers having a high degree of crystallinity have been in use for many years. They have been used in many applications, as for example, automobile bumper extensions and instrument panels; plumbing supplies, such as valves, shower assemblies, flush tank components, faucets and pipe fittings; tool components; and household and personal products.

These crystalline acetal polymers have excellent physical properties. However, for certain applications, improved impact resistance is highly desirable. Typically, impact strength of a crystalline polymer is improved by blending the crystalline polymer with an elastomer to form shock-absorbing rubbery domains in the crystalline polymer. This approach to impact resistance is most successful when there is a strong interaction between the surface of the rubbery domains and the crystalline polymer. Elastomeric polymers which have strong interactions with a crystalline polymer also are useful for bonding two surfaces of the crystalline polymer and for bonding the crystalline polymer to other materials.

Acetal copolymers have recently been synthesized wherein the compositions have been chosen to yield non-crystalline acetals whose chemical structure is similar enough to the chemical structure of the crystalline acetals to interact well with them.

For example, commonly assigned U.S. Pat. No. 4,788,258 discloses acetal copolymers derived from trioxane and 1,3-dioxolane, with the 1,3-dioxolane content being between about 65 and 75 mol percent of the polymer based on the total monomer composition. These polymers have a glass transition temperature that is less than about −60° C. Blends of these non-crystalline copolymers with crystalline acetal polymers show improved impact resistance over that of the unblended crystalline acetals.

Commonly assigned U.S. Pat. No. 4,758,608 teaches non-crystalline acetal terpolymers which are curable in ultraviolet light. These terpolymers are synthesized from trioxane, 1,3-dioxolane, and formals of monoethylenically unsaturated aliphatic diols. When they are cured with multifunctional crosslinking monomers, insoluble, rubbery, non-tacky polymers are obtained which are useful for blending with crystalline acetals to produce resins with improved impact properties.

Copending and commonly assigned U.S. Ser. No. 406,641 discloses acetal copolymers made from 1,3-dioxolane and 1,3-dioxepane. These copolymers are elastomeric and have glass transition temperatures which are as −80° C. Blends of these copolymers with crystalline acetal polymers exhibit improved impact resistance.

There are currently a limited number of elastomeric acetal polymer compositions, and only one elastomeric acetal polymer that can be crosslinked has been reported, as cited above. Additional compositions are needed so that workers of skill in the art will have a broader range of elastomers that can be blended with crystalline acetal resins to achieve the desired combination of properties for specific end-uses. Such properties include, for example, impact resistance, compatibility with other additives and fillers, tensile strength, and stable morphology.

SUMMARY OF THE INVENTION

The compositions disclosed herein are non-crystalline ethylenically unsaturated elastomeric acetal polymers. The polymers have glass transition temperatures considerably lower than room temperature. Because the polymers have ethylenic unsaturation, they can be vulcanized or cured with multifunctional vinyl monomers to produce acetals with greater elasticity, decreased thermoplastic behavior, and increased solvent resistance.

The non-crystalline ethylenically unsaturated elastomeric acetal polymers disclosed herein are synthesized by the polymerization of 1,3-dioxolane, 1,3-dioxepane, and a cyclic formal of a monoethylenically unsaturated diol which has at least 4 adjacent carbon atoms in its main chain. The preferred cyclic formal is 4,7-dihydro-1,3-dioxepin, which is preferably incorporated into the polymer at a level of about 1% to about 10%, based on the volume of 4,7-dihydro-1,3-dioxepin as a percent of the combined volume of the other two monomers.

These non-crystalline ethylenically unsaturated elastomeric acetal polymers are vulcanized by methods well known in the art or are cured with multifunctional vinyl monomers. In the latter case, the curing is induced by ionizing radiation, such as gamma irradiation or electron beam irradiation or by ultraviolet or visible light and an added photosensitizer. The resulting elastomeric acetal polymers, after vulcanization or curing, have decreased thermoplasticity and increased solvent resistance compared with the starting elastomeric acetal polymers.

The elastomeric acetal polymers, either in their as-made state or after vulcanization or curing, are particularly useful for blending with crystalline acetal polymers. These blends should have improved impact resistance and are expected to have stable morphology because the elastomeric acetal polymers and crystalline acetal polymers are similar in composition in that they all contain oxymethylene repeat units as a major part of the polymer backbone.

DETAILED DESCRIPTION OF THE INVENTION

Non-Crystalline Ethylenically Unsaturated Elastomeric Acetal Polymers

The non-crystalline ethylenically unsaturated elastomeric acetal polymers (also referred to as "unsaturated elastomeric acetal polymers") are obtained by polymerization of 1,3-dioxolane, 1,3-dioxepane, and the cyclic formal of a monoethylenically unsaturated aliphatic diol, such as 4,7-dihydro-1,3-dioxepin. These polymers are elastomers and have a glass transition temperature well below room temperature. The three monomer units can be copolymerized over a broad range of amounts with respect to one another. The ratio of 1,3-dioxolane and 1,3-dioxepane monomers on a volume/volume basis can be anywhere in the range of about 80/20 to about 20/80, more preferably in the range of about 60/40 to about 40/60, and most preferably in about a 50/50 ratio. The cyclic formal of a monoethylenically unsaturated diol or mixture of cyclic formals of monoethylenically unsaturated diols can be present in the monomer solution prior to polymerization in the range of about 0.1–20%, based on the volume of unsaturated cyclic formal as a percent of the combined volumes of 1,3-dioxolane and 1,3-dioxepane, and more preferably in the range of about 1–10%. Because the monomers are all cyclic formals, the polymers all contain oxymethylene monomer units as about 50% of the polymer chain.

The cyclic formal of a monoethylenically unsaturated aliphatic diol is derived from a monoethylenically unsaturated aliphatic diol having at least 4 carbon atoms in its main chain. Preferably, the unsaturated diol has 4 to 8 carbon atoms in its main chain. The carbon atoms in the main chain may be unsubstituted or may be substituted with one or more aliphatic side chains having from 1 to about 4 carbon atoms. Examples of cyclic formals of monoethylenically unsaturated aliphatic diols include 4,7-dihydro-1,3-dioxepin (2-butene-1,4-diol formal), 3-pentene-1,4-diol formal, 2-ethyl-2-butene-1,4-diol formal, and 2-octene-1,4-diol formal. Mixtures of two or more monoethylenically unsaturated aliphatic diol formals may also be used. The preferred monoethylenically unsaturated aliphatic diol formal is 4,7-dihydro-1,3-dioxepin.

The monoethylenically unsaturated aliphatic diol formals are readily made by methods well known in the art. The preferred monoethylenically unsaturated aliphatic diol formal, 4,7-dihydro-1,3-dioxepin, is commercially available, as are the two saturated comonomers, 1,3-dioxolane and 1,3-dioxepane.

The polymerization may be carried out in a solvent, but is preferably carried out in bulk, without solvent. If a solvent is used, halogenated solvents, such as methylene chloride, or hydrocarbons, as for example cyclohexane or hexane, may be used. Any solvent is suitable provided that it does not react with the catalyst or participate in the reaction. The polymerization is carried out under a dry, inert atmosphere, such as nitrogen or argon. The atmosphere, the reactants, and the solvent, if used, should be substantially anhydrous. Preferably, less than 10 ppm of water should be present, since the presence of water leads to chain transfer, resulting in reduced molecular weight. The reactants can be dried by any of the methods commonly used for drying organic ethers, such as distillation from sodium/potassium alloy, followed by subsequent handling using techniques that minimize exposure to air.

Catalysts effective for the polymerization are cationic polymerization catalysts. These include strong Bronsted acids, such as for example trifluoromethanesulfonic acid (the preferred catalyst) or p-toluenesulfonic acid. Also included are Lewis acids, such as for example p-nitrobenzenediazonium tetrafluoroborate, boron trifluoride, and phosphorous pentafluoride. Catalyst concentrations should preferably be low, ranging from about $10^{-3}$M to about $10^{-5}$M in order to achieve high molecular weight. A catalyst concentration of about $10^{-4}$M is preferred when trifluoromethanesulfonic acid is used as catalyst. The catalyst may be diluted in a dry, inert solvent, such as nitromethane or methylene chloride, prior to being measured to facilitate accurate measurement of the small amount of catalyst needed to effect polymerization.

Elevated temperatures and pressures are not needed to effect polymerization. Thus, the preferred conditions are atmospheric pressure and ambient temperature. Under these conditions, polymerization is generally complete in less than 24 hours. When trifluoromethanesulfonic acid is used as catalyst at a concentration of about $10^{-4}$M, polymerization is complete in less than an hour.

The polymers that are obtained are transparent, water white, and elastomeric. No evidence of crystallinity has been observed. Similar polymers derived from 1,3-dioxepane and 1,3-dioxolane but without the cyclic formal of an unsaturated diol, described in copending and commonly assigned U.S. Ser. No. 406,641, are non-crystalline at temperatures as low as −120° C. and below. The polymer derived from equimolar amounts of 1,3-dioxolane and 1,3-dioxepane has a glass transition temperature measured at about −79° C. by differential scanning calorimetry. The polymers disclosed herein are similar in appearance to the polymers of 1,3-dioxolane and 1,3-dioxepane and should exhibit similar thermal behavior.

The non-crystalline ethylenically unsaturated elastomeric acetal polymers described above are particularly useful for blending with crystalline acetal polymers. Because these polymers are derived from three cyclic monomers, each of which is a cyclic formal, the polymers comprise oxymethylene units as about 50% (on a mole basis) of the polymer backbone, oxymethylene units being defined as having the following structure:

$$-O-CH_2-$$

The polymers are therefore acetal polymers and should blend well with crystalline acetal polymers, which also contain oxymethylene units, but at a higher concentration, as described hereinafter. The blended polymers should have improved physical properties, such as, for example, impact resistance, because of the presence of elastomeric domains in the blend.

Vulcanized Unsaturated Elastomeric Acetal Polymers

In another embodiment of this invention, the unsaturated elastomeric acetal polymers are vulcanized, yielding an elastomer with greater toughness and elasticity. The unsaturated elastomeric acetal polymers are in general less tacky, less soluble, less thermoplastic, and more rubbery after vulcanization. Methods for vulcanizing elastomers are well known in the art. The unsaturated acetal polymers as taught herein can be vulcanized by any of the techniques commonly used for other natural and synthetic rubbers which contain monoethylenic unsaturation (e.g. natural rubber, synthetic poly(isoprene), poly(butadiene), SBR, EPDM, and the like). These methods include sulfur vulcanization; accelerated sulfur vulcanization; and vulcanization using agents based on phenolics, benzoquinone derivatives, bis(maleimides), organic peroxides, and the like. A review of vulcanization can be found under the title "Vulcanization" by A. Y. Coran, pp. 666–698 in *Encyclopedia of Polymer Science and Technology*, Second Edition, Vol. 17, John Wiley & Sons, New York, 1989, which article is herein incorporated by reference. The vulcanized unsaturated elastomeric acetal polymers are particularly useful for blending with crystalline acetal polymers to improve the impact properties of the acetal polymers.

Unsaturated Elastomeric Acetal Polymers Cured with Crosslinking Monomers

In a further embodiment, the unsaturated elastomeric acetal polymers as taught herein may be cured with multifunctional vinyl monomers, which function as crosslinkers. The cured polymers of this embodiment are made by thoroughly mixing the unsaturated elastomeric acetal polymers and the multifunctional vinyl cross-linking monomers, along with a photoinitiator, which is included to effect the cure in the presence of ultraviolet or visible light. Alternatively, ionizing radiation (e.g. electron beam or gamma irradiation) can be used to effect the cure, in which case a photoinitiator is not necessary. The reactants should be blended intimately or should form a solution. This can be achieved by melt blending or by dissolving the reactants in a common solvent followed by removal of the solvent. The amounts of unsaturated elastomeric acetal polymer, multifunctional vinyl monomer, and photoinitiator, if used, will preferably be in the range of about 1 part (by weight) of unsaturated elastomeric acetal polymer, about 0.05 to 1 parts of multifunctional vinyl monomer, and about 0.005 to 0.10 parts of photoinitiator. The multifunctional vinyl monomers are typically acid esters of aliphatic diols or polyols (e.g. ethylene glycol or 1,6-hexanediol), wherein the acid groups are reactive vinyl monomers (e.g. acrylic acid, methacrylic acid, itaconic acid, and the like). Examples of preferred multifunctional monomers for use in this embodiment include 1,6-hexanediol diacrylate and trimethylolpropane triacrylate. A more extensive list of multifunctional monomers that may be used can be found in U.S. Pat. No. 4,758,608, which is herein incorporated by reference.

The photoinitiator can be any of the compounds conventionally employed in the art to promote ultraviolet or visible light curing of unsaturated polymeric materials. These include ketals, such as benzyldimethyl ketal; benzoins and alkyl and aryl ethers of benzoin, such as for example benzoin methyl ether; $\alpha$-hydroxyacetophenones, such as $\alpha$-hydroxy-$\alpha,\alpha$-dimethylacetophenone; $\alpha,\alpha$-diethoxy-$\alpha$-phenylacetophenone; $\alpha,\alpha$-dimethoxy-$\alpha$-phenylacetophenone; and similar photoinitiators, all of which are generally believed to promote curing by intramolecular cleavage to free radicals in the presence of ultraviolet light. Also included are photoinitiators which are believed to activate curing by intermolecular abstraction of a hydrogen atom when irradiated with ultraviolet light, thereby generating free radicals. The latter type of photoinitiator often functions best in the presence of added donor compounds which have a readily abstracted hydrogen atom. The most common of these donor compounds are tertiary aliphatic amines with hydrogen atoms on the carbon atom $\alpha$ to the nitrogen atom, as for example trimethylamine or dimethylethanolamine. Examples of this type of photoinitiator are benzophenone, anthraquinone and other quinones, Michler's ketone, thioxanthones, and benzil. More detailed information on photoinitiators and ultraviolet and visible light curing may be found in an article entitled "Photopolymerization," by S. P. Pappas, pp. 186–212 in *Encyclopedia of Polymer Science and Technology*, Second Edition, Vol. 11, John Wiley and Sons, New York, 1989, which article is herein incorporated by reference.

The curing is effected by exposure of the mixture of unsaturated elastomeric acetal polymer, multifunctional monomer and initiator to ultraviolet or visible light from any of a variety of commonly used sources, such as sunlamps, natural sunlight, chemical lamps, low pressure and high pressure mercury vapor lamps, carbon arc lamps, xenon lamps, metal halide lamps, etc. Curing is generally achieved by irradiation with an energy density of about 20–200 mW/cm$^2$ for a period of time from about 1 second to about 15 minutes. Alternatively, curing can be achieved without the use of a photoinitiator by exposure to ionizing radiation, as for example an electron beam or gamma radiation, the latter of which is often obtained from $^{60}$Co.

Ultraviolet curing of a different unsaturated elastomeric acetal composition using benzoin isobutyl ether as a photoinitiator is presented in detail, including working examples, in previously incorporated reference U.S. Pat. No. 4,758,608.

Crystalline Acetal Polymers

The unsaturated elastomeric acetal polymers as taught in any of the embodiments described above are particularly useful for blending with crystalline acetal polymers to provide blends with improved impact resistance compared with unblended crystalline acetal polymers.

Acetal polymers in general are characterized as having recurring oxymethylene repeat units of the following formula:

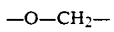

$$-O-CH_2-$$

The unsaturated elastomeric acetal polymers taught herein have relatively low levels of oxymethylene repeat units (about 50% on a molar basis) and are expected to be non-crystalline even at temperatures as low as $-120°$ C. and below.

The highly crystalline acetals, on the other hand, have a fairly high content of oxymethylene units (generally greater than about 85%). These materials are commercially available from a number of manufacturers as homopolymers, copolymers, terpolymers, etc. These highly crystalline acetals, described briefly hereinbelow, are well known in the art and have been reviewed extensively. For example, a review of acetals can be found in an article by T. J. Dolce and J. A. Grates entitled "Acetal Resins," pp. 42–61 in *Encyclopedia of Polymer Science and Engineering*, Vol. 1, John Wiley and Sons, New York, 1985. This article is incorporated herein by reference. Additional information on acetal copolymers and terpolymers can also be found in previously incorporated U.S. Pat. No. 4,758,608.

Typically acetal homopolymers, or poly(oxymethylenes), are prepared by polymerizing anhydrous formaldehyde or trioxane. Oxymethylene homopolymers are usually stabilized against thermal degradation by end-capping with, for example, ester or ether groups, such as those derived from alkanoic anhydrides, as for example acetic anhydride, or dialkyl ethers, as for example dimethyl ether, or by incorporating stabilizer compounds into the homopolymer. Commercially available acetal homopolymer is made by polymerizing anhydrous formaldehyde in the presence of an initiator, after which the polymer is end-capped by acetylation of the hemiacetal end groups with acetic anhydride in the presence of sodium acetate catalyst. Methods for making and end-capping acetal homopolyers are taught in U.S. Pat. Nos. 2,768,994 and 2,998,409. Acetal homopolymer is commercially available under the trademarks Delrin ® and Tenac ®.

Acetals which are especially suitable for use in the blends of the present invention are crystalline oxymethylene copolymers having repeat units which consist essentially of oxymethylene groups interspersed with oxy(higher alkylene) groups represented by the general formula:

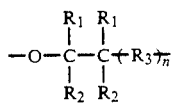

wherein $R_1$ and $R_2$ are hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms. Oxymethylene groups generally will constitute from about 85 to about 99.9 percent of the recurring units in such copolymers and are generally incorporated by ring-opening polymerization of trioxane in the presence of an acidic catalyst. The oxy(higher alkylene) groups are incorporated into the copolymer during ring-opening polymerization of trioxane by copolymerizing a cyclic ether or cyclic formal having at least two adjacent carbon atoms. The preferred oxy(higher alkylene) group is oxyethylene, having the formula:

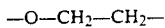

Oxyethylene is incorporated into the polymer by copolymerization of ethylene oxide or 1,3-dioxolane with trioxane.

Acetal copolymers as described above, which have a structure consisting essentially of oxymethylene and oxyethylene groups, are thermoplastic materials having a melting point of at least 150° C. They normally are millable or processable at temperatures ranging from about 175° C. to about 200° C. and have a number average molecular weight of at least 10,000. They are normally highly crystalline, having a polymer crystallinity from about 60% to about 80% or greater.

A particularly preferred class of oxymethylene copolymers is commercially available under the tradename Celcon ® acetal copolymer. Celcon ® is a registered trademark of Hoechst Celanese Corporation, the assignee of the present invention. Celcon ® acetal is a copolymer made from about 98 weight % trioxane and about 2 weight % ethylene oxide. Blends of the current invention may be made using any commercial grade of Celcon ® acetal polymer. Acetal copolymers are also available from other manufacturers under several trademarks, including Hostaform ®, Duracon ®, Ultraform ®, and Iupital ®.

Oxymethylene terpolymers may also be used in making blends of the present invention. These comprise oxymethylene groups, oxy(higher alkylene) groups as described above, and a different third group derived from a bifunctional monomer interpolymerized with oxymethylene and oxy(higher alkylene) groups. The bifunctional monomer generally has the formula:

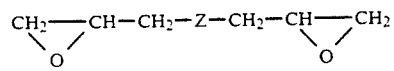

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one have from 2 to 4 recurring lower alkoxy groups each with 1 or 2 carbon atoms. Examples include the diglycidyl ethers of ethylene glycol, 1,3-butanediol, and 1,4-butanediol, with the diglycidyl ether of 1,4-butanediol being preferred. A terpolymer as described above comprising about 98% by weight trioxane, about 2% by weight ethylene oxide, and about 0.05% by weight butanediol diglycidyl ether as the monomer units is commercially available from Hoechst Celanese Corporation under the name Celcon ® U10 acetal polymer. More detailed descriptions of the methods for making oxymethylene-based copolymers and terpolymers and their compositions can be found in previously incorporated U.S. Pat. No. 4,758,608.

The crystalline acetal polymers may also contain additives, such as plasticizers, formaldehyde scavengers, nucleating agents, mold lubricants, antioxidants, fillers (e.g. glass fibers, beads, etc.), colorants, pigments reinforcing agents, light stabilizers, other stabilizers, and the like. These all may be included in the blend so long as they don't detrimentally affect the blend, as for example by causing chemical decomposition of the elastomeric acetal polymer.

Blends with Crystalline Acetal Polymers

Blends of the unsaturated elastomeric acetal polymers in any of their embodiments and crystalline acetal polymers can be made by any of the conventional methods that will result in a uniform blend. These methods are well known in the art. Typically, the elastomeric acetal polymer, in the form of a dry to a tacky solid, is dry mixed with the crystalline acetal polymer, which may be in the form of pellets, chips, flakes, granules or powder, usually at room temperature. The resulting mixture is melt blended in any conventional type extrusion equipment, which is customarily heated to a temperature from about 170° C. to about 220° C., and preferably from about 190° C. to about 210° C., for a time sufficient to give a uniform mixture. The sequence of addition is not critical. Various other additives, such as plasticizers, formaldehyde scavengers, nucleating agents, mold lubricants, antioxidants, fillers (e.g. glass fibers, beads, etc.) colorants, pigments, reinforcing agents, light stabilizers, other stabilizers, and the like may also be added prior to melt blending, or these additives may have already been blended with one or both of the polymers to be blended. In the case of the unsaturated elastomeric acetal polymer after it has been vulcanized, crosslinked, or cured in some way, it may be necessary to grind the elastomeric acetal to a particle size suitable for impact modified blends. Grinding can be performed by any of the methods commonly used in the art for grinding elastomers, such as for example, cryogenic grinding.

Preferably, the unsaturated elastomeric acetal polymer and the crystalline acetal polymer are dried (either individually or together) before being subjected to the blending procedure. Drying can be done in desiccated air having a dew point of about −30° C. to about −40° C. or lower, at a temperature of from about 70° C. to about 110° C. The drying time will depend primarily on the moisture content, drying temperature, and particular equipment employed, but typically is from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 weight percent, based on the total weight of the unsaturated elastomeric acetal polymer and the crystalline oxymethylene polymer, preferably below about 0.05 weight percent, and most preferably below about 0.01 weight percent.

The uniform product obtained by the blending procedure is then comminuted mechanically, for example by chopping, pelletizing or grinding into granules, pellets, chips, flakes or powders. The blend is finally processed in the thermoplastic state, for example by injection molding or extrusion molding, into shaped articles, including bars, rods, plates, sheets, films, ribbons, tubes, and the like. Preferably, prior to molding, the comminuted blend is dried again, in the manner discussed above.

In order that those skilled in the art can more fully understand this invention, the following examples are provided.

EXAMPLE 1

1,3-Dioxolane (50 ml), 1,3-dioxepane (50 ml), and 4,7-dihydro-1,3-dioxepin (1 ml) were combined in a dry 4-ounce narrow neck bottle with a magnetic stirrer under a nitrogen atmosphere. The combined monomers contained water at a measured level of 6 μg/ml. A 0.1% solution of trifluoromethanesulfonic acid in nitromethane was made up, and 0.89 ml of this solution was added to the monomer solution, resulting in an acid concentration of about 0.0001M. In less than an hour a transparent, water white elastomer was obtained.

EXAMPLE 2

Using the same procedure as in Example 1,3-dioxolane (50 ml), 1,3-dioxepane (50 ml) and 4,7-dihydro-1,3-dioxepin (2 ml) were combined under nitrogen. The water content of the monomer solution was measured at 8 μg/ml. The monomer solution was treated with 0.9 ml of a 0.1% (vol/vol) solution of trifluoromethanesulfonic acid in nitromethane, thereby providing an acid concentration of 0.0001M. A transparent, rubbery, water-white polymer formed in less than an hour.

EXAMPLE 3

Using the same procedure as in Examples 1 and 2, 1,3-dioxolane (50 ml), 1,3-dioxepane (50 ml), and 4,7-dihydro-1,3-dioxepin (10 ml) were combined under nitrogen. The water content of the monomer solution was measured to be 10 μg/ml. The monomer solution was treated with 0.97 ml of a 0.1% solution (vol/vol) of trifluoromethansulfonic acid in nitromethane so that the acid concentration was 0.0001M. A transparent, water-white, elastomer was obtained in less than an hour.

EXAMPLES 4–16

Copolymers of 1,3-dioxolane, 1,3-dioxepane, and 4,7-dihydro-1,3-dioxepin are made by combining the monomers in the amounts shown in Table 1 in narrow neck glass bottles with magnetic stirrers under nitrogen and adding enough 0.1% trifluoromethanesulfonic acid in nitromethane to the monomer solution to achieve a total acid concentration of about 0.0001M. In all cases, the water content of the combined monomer solutions is less than or equal to about 10 μg/ml. All of the copolymers are rubbery, transparent and water-white.

TABLE I

| Example No. | Composition | | |
|---|---|---|---|
| | 1,3-Dioxolane (ml) | 1,3-Dioxepane (ml) | 4,7-Dihydro-1,3-Dioxepin (ml) |
| 4 | 80 | 20 | 1 |
| 5 | 80 | 20 | 10 |
| 6 | 60 | 40 | 1 |
| 7 | 60 | 40 | 5 |
| 8 | 60 | 40 | 10 |
| 9 | 50 | 50 | 1 |
| 10 | 50 | 50 | 5 |
| 11 | 50 | 50 | 10 |
| 12 | 40 | 60 | 1 |
| 13 | 40 | 60 | 10 |
| 14 | 20 | 80 | 1 |
| 15 | 20 | 80 | 5 |
| 16 | 20 | 80 | 10 |

EXAMPLE 17

The unsaturated elastomeric acetal of Example 3 (1.0 gm), 1,6-hexanediol diacrylate (0.1 gm), and benzoin isobutyl ether (0.01 gm) are combined in a solvent, which is subsequently removed by evaporation. The reaction mixture is then subjected to ultraviolet light in a Radiation Polymer Company UV Processor for 5 minutes. A crosslinked polymer is obtained, as determined by the substantial insolubility of the polymer in the solvent that was previously used for combining the reactants.

EXAMPLE 18

The cured elastomer of Example 17 is ground to a small particle size. Mixtures of this crosslinked material with Celcon ® acetal resin, from Hoechst Celanese Corporation, are prepared containing 2%, 5%, 10%, 15%, 20%, 25% and 30% of the crosslinked elastomer by mixing at room temperature in a dry atmosphere the ground cross-linked elastomer with Celcon ® acetal copolymer. Prior to mixing, the Celcon ® polymer acetal in granulated form is dried by heating to 75° C. overnight in a dry atmosphere. The mixture of Celcon ® acetal polymer and cured elastomer are then blended in an extruder at 190°–210° C. A molding resin with improved impact strength is obtained.

It is to be understood that the above-described embodiments of the invention are illustrative only and that modification throughout may occur to one skilled in the art. Accordingly, this invention is not to be regarded as limited to the embodiments disclosed herein but is to be limited and defined only by the appended claims.

What is claimed is:

1. An ethylenically unsaturated elastomeric acetal polymer, consisting essentially of monomer units derived from 1,3-dioxolane, 1,3-dioxepane, and a cyclic formal of a monoethylenically unsaturated diol, said monoethylenically unsaturated diol containing at least 4 adjacent carbon atoms in its main chain.

2. An ethylenically unsaturated elastomeric acetal polymer as recited in claim 1, wherein said monomer units derived from 1,3-dioxolane and 1,3-dioxepane are included in the polymer in a ratio ranging from about 80:20 to about 20:80 based on the volumes of said 1,3-dioxolane and said 1,3-dioxepane, and wherein said monomer units derived from a cyclic formal of a monoethylenically unsaturated diol are included in the polymer in the range of about 0.1% to about 20% based on the volume of said cyclic formal as a % of the combined volumes of said 1,3-dioxolane and said 1,3-dioxepane.

3. An ethylenically unsaturated elastomeric acetal polymer as recited in claim 1, wherein said monomer units derived from 1,3-dioxolane and 1,3-dioxepane are included in the polymer in a ratio ranging from about 60:40 to about 40:60 based on the volumes of said 1,3-dioxolane and said 1,3-dioxepane, and wherein said monomer units derived from a cyclic formal of a monoethylenically unsaturated diol are included in the polymer in the range of about 1% to about 10% based on the volume of said cyclic formal as a % of the combined volumes of said 1,3-dioxolane and said 1,3-dioxepane.

4. An ethylenically unsaturated elastomeric acetal polymer as recited in claim 3, wherein said monomer units derived from 1,3-dioxolane and 1,3-dioxepane are included in the polymer in a ratio of about 50:50 based on the volumes of said 1,3-dioxolane and said 1,3-dioxepane.

5. An ethylenically unsaturated elastomeric acetal polymer as recited in claim 1, wherein said cyclic formal of a monoethylenically unsaturated diol consists of one or more cyclic formals of monoethylenically unsaturated diols having from 4 to 8 carbon atoms in their main chain, said carbon atoms being unsubstituted or being substituted with aliphatic side chains containing from 1 to about 4 carbon atoms.

6. An ethylenically unsaturated elastomeric acetal polymer as recited in claim 1, wherein said cyclic formal of a monoethylenically unsaturated diol is 4,7-dihydro-1,3-dioxepin.

7. A cured elastomeric acetal polymer, wherein the ethylenically unsaturated elastomeric acetal polymer as recited in claim 6 and a multifunctional vinyl monomer have been uniformly mixed and subsequently irradiated with ionizing radiation.

8. An impact modified crystalline acetal polymer blend comprising a uniform mixture of the ethylenically unsaturated elastomeric acetal polymer as recited in claim 6 and a crystalline acetal polymer.

9. A vulcanized elastomeric acetal polymer, consisting essentially of the ethylenically unsaturated elastomeric acetal polymer as recited in claim 1, wherein said ethylenically unsaturated elastomeric acetal polymer has been subjected to a vulcanization process.

10. A vulcanized elastomeric acetal polymer as recited in claim 9, wherein said cyclic formal of a monoethylenically unsaturated diol is 4,7-dihydro-1,3-dioxepin.

11. An impact modified crystalline acetal polymer blend comprising a uniform mixture of the vulcanized elastomeric acetal polymer as recited in claim 9 and a crystalline acetal polymer.

12. An impact modified crystalline acetal polymer blend as recited in claim 11, wherein said crystalline acetal polymer is an end-capped oxymethylene homopolymer.

13. An impact modified crystalline acetal polymer blend as recited in claim 11, wherein said crystalline acetal polymer is a copolymer consisting essentially of oxymethylene units interspersed with oxy(higher alkylene) groups of the formula:

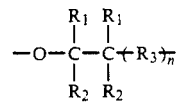

wherein $R_1$ and $R_2$ are each selected from hydrogen and a lower alkyl group; $R_3$ is selected from methylene, oxymethylene, lower alkyl-substituted methylene, and lower alkyl-substituted oxymethylene groups; and n is an integer from zero to 3.

14. An impact modified crystalline acetal polymer blend as recited in claim 11, wherein said crystalline acetal is a copolymer of trioxane and a cyclic ether selected from the group consisting of 1,3-dioxolane, ethylene oxide, and mixtures thereof.

15. An impact modified crystalline acetal polymer blend as recited in claim 11, wherein said crystalline acetal polymer is a terpolymer consisting essentially of monomer units derived from (1) trioxane; (2) ethylene oxide, 1,3-dioxolane or a mixture thereof; and (3) a bifunctional monomer.

16. An impact modified crystalline acetal polymer blend as recited in claim 11, wherein said crystalline acetal polymer is a terpolymer consisting essentially of monomer units derived from trioxane, ethylene oxide, and the diglycidyl ether of 1,4-butanediol.

17. An impact modified crystalline acetal polymer blend comprising a uniform mixture of the vulcanized elastomeric acetal polymer as recited in claim 9; a crystalline acetal polymer; and one or more additives selected from the group consisting of plasticizers, formaldehyde scavengers, nucleating agents, mold lubricants, antioxidants, fillers, colorants, pigments, reinforcing agents, light stabilizers, and other stabilizers.

18. A cured elastomeric acetal polymer, wherein the ethylenically unsaturated elastomeric acetal polymer as recited in claim 1, a multifunctional vinyl monomer and a photoinitiator have been uniformly mixed and subsequently cured with ultraviolet or visible light.

19. A cured elastomeric acetal polymer, as recited in claim 18, wherein said cyclic formal of a monoethylenically unsaturated diol is 4,7-dihydro-1,3-dioxepin.

20. A cured elastomeric acetal polymer as recited in claim 18, wherein about 1 parts by weight of the ethylenically unsaturated elastomeric acetal polymer, about 0.05 to about 1 parts by weight of said multifunctional vinyl monomer, and about 0.005 to about 0.10 parts by weight of said photoinitiator have been uniformly mixed and subsequently cured with ultraviolet or visible light.

21. A cured elastomeric acetal polymer as recited in claim 18, wherein the ethylenically unsaturated elastomeric acetal polymer, said multifunctional vinyl monomer, and said photoinitiator have been uniformly mixed and subsequently cured with ultraviolet or visible light at an energy density of about 20–200 mW/cm² for a time of about 1 second to about 15 minutes.

22. An impact modified crystalline acetal polymer blend, comprising a uniform mixture of the cured elastomeric acetal polymer as recited in claim 18 and a crystalline acetal polymer.

23. An impact modified crystalline acetal polymer blend as recited in claim 22, wherein said crystalline acetal polymer is an end-capped oxymethylene homopolymer.

24. An impact modified crystalline acetal polymer blend as recited in claim 22, wherein said crystalline acetal is a copolymer consisting essentially of oxymethylene units interspersed with oxy(higher alkylene) groups of the formula:

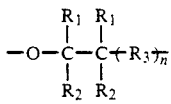

wherein $R_1$ and $R_2$ are each selected from hydrogen and a lower alkyl group; $R_3$ is selected from methylene, oxymethylene, lower alkyl-substituted methylene, and lower alkyl-substituted oxymethylene groups; and n is an integer from zero to 3.

25. An impact modified crystalline acetal polymer blend as recited in claim 22, wherein said crystalline acetal is a copolymer of trioxane and a cyclic ether selected from the group 1,3-dioxolane, ethylene oxide, and mixtures thereof.

26. An impact modified polymer blend as recited in claim 22, wherein said crystalline acetal polymer is a terpolymer consisting essentially of monomer units derived from (1) trioxane; (2) ethylene oxide, 1,3-dioxolane, or a mixture thereof; and (3) a bifunctional monomer.

27. An impact modified polymer blend as recited in claim 22, wherein said crystalline acetal polymer is a terpolymer of trioxane, ethylene oxide, and butanediol diglycidyl ether.

28. An impact modified crystalline acetal polymer blend comprising a uniform mixture of the cured elastomeric polymer as recited in claim 18; a crystalline acetal polymer; and one or more additives selected from the group consisting of plasticizers, formaldehyde scavengers, nucleating agents, mold lubricants, antioxidants, fillers, colorants, pigments, reinforcing agents, light stabilizers, and other stabilizers.

29. A cured elastomeric acetal polymer, wherein the ethylenically unsaturated elastomeric acetal polymer as recited in claim 1 and a multifunctional vinyl monomer have been uniformly mixed and subsequently irradiated with ionizing radiation.

30. A cured elastomeric acetal polymer as recited in claim 7 wherein 1 part by weight of the ethylenically unsaturated elastomeric acetal polymer and about 0.05 to about 1 parts by weight of said multifunctional vinyl monomer have been uniformly mixed and subsequently irradiated with ionizing radiation.

31. An impact modified crystalline acetal polymer blend comprising a uniform mixture of the ethylenically unsaturated elastomeric acetal polymer as recited in claim 1 and a crystalline acetal polymer.

32. An impact modified crystalline acetal polymer blend as recited in claim 31, wherein said crystalline acetal polymer is an end-capped oxymethylene homopolymer.

33. An impact modified crystalline acetal polymer blend as recited in claim 31, wherein said crystalline acetal is a copolymer consisting essentially of oxymethylene units interspersed with oxy(higher alkylene) groups of the formula:

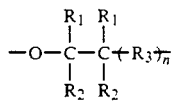

wherein $R_1$ and $R_2$ are each selected from hydrogen and a lower alkyl group; $R_3$ is selected from methylene, oxymethylene, lower alkyl-substituted methylene, and lower alkyl-substituted oxymethylene groups; and n is an integer from zero to 3.

34. An impact modified crystalline acetal polymer blend as recited in claim 31, wherein said crystalline acetal is a copolymer of trioxane and a cyclic ether selected from the group consisting of 1,3-dioxolane, ethylene oxide, and mixtures thereof.

35. An impact modified crystalline acetal polymer blend as recited in claim 31, wherein said crystalline acetal polymer is a terpolymer consisting essentially of monomer units derived from (1) trioxane; (2) ethylene oxide, 1,3-dioxolane, or a mixture thereof; and (3) a bifunctional monomer.

36. An impact modified crystalline acetal polymer blend as recited in claim 31, wherein said crystalline acetal is a terpolymer consisting essentially of monomer units derived from trioxane, 1,3-dioxolane, and the diglycidyl ether of 1,4-butanediol.

37. An impact modified crystalline acetal polymer blend, comprising a uniform mixture of the ethylenically unsaturated elastomeric acetal polymer as recited in claim 1; a crystalline acetal polymer; and one or more additives selected from the group consisting of plasticizers, formaldehyde scavengers, nucleating agents, mold lubricants, antioxidants, fillers, colorants, pigments, reinforcing agents, light stabilizers and other stabilizers.

38. A method for producing an impact modified crystalline acetal polymer blend, comprising the steps of:
(a) polymerizing 1,3-dioxolane, 1,3-dioxepane, and a cyclic formal of a monoethylenically unsaturated diol containing at least 4 adjacent carbon atoms in its main chain to produce an ethylenically unsaturated elastomeric acetal polymer;
(b) providing a crystalline acetal polymer, wherein at least about 85% of the recurring monomer units of said crystalline acetal polymer are oxymethylene units; and
(c) blending said ethylenically unsaturated elastomeric acetal polymer and said crystalline acetal polymer to form a uniform mixture.

39. The method as recited in claim 38, wherein said cyclic formal of a monoethylenically unsaturated elastomeric acetal polymer is 4,7-dihydro-1,3-dioxepin.

40. The method as recited in claim 38, further comprising the step of vulcanizing said ethylenically unsaturated elastomeric acetal polymer.

41. The method as recited in claim 38, further comprising the steps of uniformly mixing said ethylenically unsaturated elastomeric acetal polymer with a multifunctional vinyl monomer and a photoinitiator, and subsequently curing the mixture of said ethylenically unsaturated elastomeric acetal polymer, said multifunctional vinyl monomer, and said photoinitiator with ultraviolet or visible light.

42. The method as recited in claim 38, further comprising the steps of uniformly mixing said ethylenically unsaturated elastomeric acetal polymer with a multifuntional vinyl monomer and subsequently curing the mixture of said ethylenically unsaturated elastomeric acetal polymer and said multifunctional vinyl monomer with ionizing radiation.

* * * * *